United States Patent
Bao et al.

(10) Patent No.: US 10,447,689 B2
(45) Date of Patent: Oct. 15, 2019

(54) SYSTEMS AND METHODS FOR AUTHENTICATING A USER DEVICE FOR A WEB SERVICE

(71) Applicant: Verizon Patent and Licensing Inc., Arlington, VA (US)

(72) Inventors: Guanqun Bao, Sunnyvale, CA (US); Manish Sharma, San Jose, CA (US); Devin Blong, Penngrove, CA (US); Kevin Flores, San Jose, CA (US); Tushar Chaudhary, San Francisco, CA (US); Gaurav Gupta, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1064 days.

(21) Appl. No.: 14/586,627

(22) Filed: Dec. 30, 2014

(65) Prior Publication Data

US 2016/0191507 A1   Jun. 30, 2016

(51) Int. Cl.
| | |
|---|---|
| *H04L 29/06* | (2006.01) |
| *H04W 12/06* | (2009.01) |
| *H04L 29/08* | (2006.01) |
| *H04W 4/50* | (2018.01) |
| *H04W 4/60* | (2018.01) |
| *H04W 12/08* | (2009.01) |
| *H04W 12/00* | (2009.01) |

(52) U.S. Cl.
CPC .......... *H04L 63/0853* (2013.01); *H04L 67/34* (2013.01); *H04W 4/50* (2018.02); *H04W 4/60* (2018.02); *H04W 12/06* (2013.01); *H04W 12/00514* (2019.01); *H04W 12/08* (2013.01)

(58) Field of Classification Search
CPC .......................... H04L 63/0853; H04L 67/32
USPC ............................................................ 726/2
See application file for complete search history.

(56) References Cited

U.S. PATENT DOCUMENTS

| | | | | |
|---|---|---|---|---|
| 6,628,940 B1 * | 9/2003 | Henrick | .......... | H04M 1/274516 |
| | | | | 455/419 |
| 8,356,333 B2 * | 1/2013 | Kramer | ............... | G06F 21/6218 |
| | | | | 726/2 |

(Continued)

OTHER PUBLICATIONS

Nonyelum, "Encryption-Based Digital Right Management in Internet Communication and Information Transfer", 2017, The IUP Journal of Computer Sciences, vol. XI, pp. 7-37 (Year: 2017).*

*Primary Examiner* — Taghi T Arani
*Assistant Examiner* — Gregory A Lane

(57) ABSTRACT

An instant access device may receive a request from a user device to access secure content corresponding to a particular web service. The instant access device may create a hash code based on a telephone number of the user device and a hash code, and may communicate the hash code to an authentication system. The authentication system may authenticate the user device by comparing the hash code to a hash table that includes a list of hash codes associated with user devices that are authorized to access the secure content. Based on whether the user device is authenticated by the authentication system, the instant access device may cause the user device to access the secure content, whether by accessing the secure content directly (when the user device authentication is successful) or by creating a new user account (when the user device authentication is unsuccessful).

20 Claims, 14 Drawing Sheets

(56) References Cited

U.S. PATENT DOCUMENTS

| | | | |
|---|---|---|---|
| 9,767,488 B1* | 9/2017 | Wang | G06Q 30/0275 |
| 2002/0110224 A1* | 8/2002 | Kovales | H04M 3/487 |
| | | | 379/67.1 |
| 2009/0279682 A1* | 11/2009 | Strandell | H04L 63/18 |
| | | | 379/201.02 |
| 2012/0144203 A1* | 6/2012 | Albisu | G06F 21/35 |
| | | | 713/184 |
| 2012/0324242 A1* | 12/2012 | Kirsch | G06Q 20/0855 |
| | | | 713/189 |
| 2013/0227139 A1* | 8/2013 | Suffling | H04L 9/3236 |
| | | | 709/225 |
| 2013/0232550 A1* | 9/2013 | Kihara | G06F 21/554 |
| | | | 726/3 |
| 2014/0090016 A1* | 3/2014 | Kruglick | H04W 12/02 |
| | | | 726/3 |

* cited by examiner

SYSTEMS AND METHODS FOR AUTHENTICATING A USER DEVICE FOR A WEB SERVICE

BACKGROUND

An interactive voice response (IVR) system may include a computer capable of interacting with a user device via a telephone call. During the telephone call, the user of the user device may request a particular service that is available via a website, a mobile application, or another type of web service; however, the IVR system may not have a solution for enabling the user device to securely access the web service.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide techniques for an IVR system to securely authenticate a user device for a web service. For example, during a telephone call between the IVR system and the user device, the user device may request access to a web service that is available via a mobile application, a website, etc. The IVR system may provide the user device with access to the web service by dynamically authenticating the user device in a manner that ensures that the personal information of the user is encrypted and not vulnerable to forfeiture.

As such, systems and/or methods, as described herein, may enable a user to access a web service using an existing user account without exposing the personal information of the user to the web service. For instance, if a user calls a company and requests to log into a mobile application of the company, the company may check to see if the user already has an account with the company based on a hashed telephone number corresponding to the user. If an account for the user exists, the user may be logged into the existing account; however, if an account for the user does not exist, a new account may be created for the user and the user may be logged into the new account.

Figure 1:
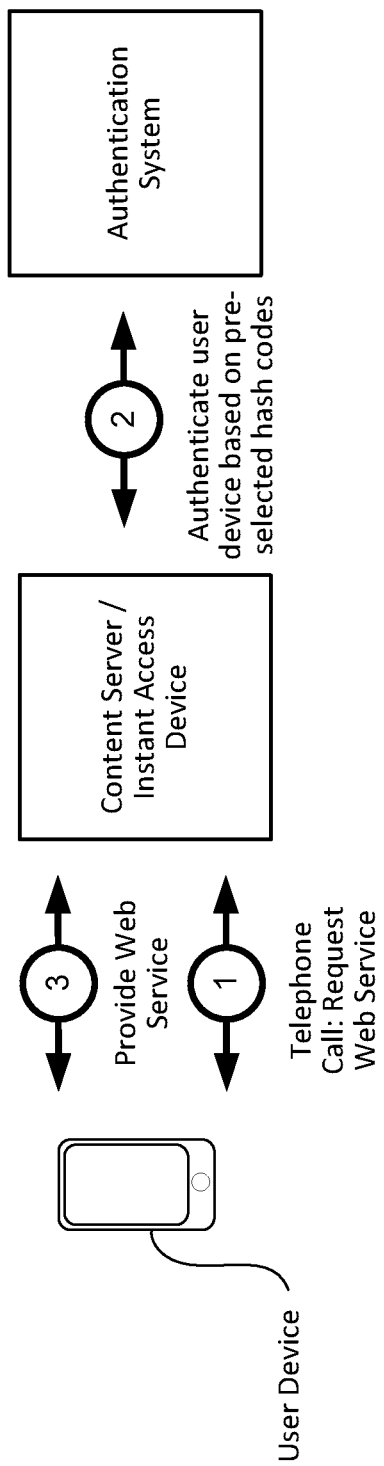
FIG. 1 illustrates an example overview of an implementation described herein.

FIG. 1 illustrates an example overview of an implementation described herein. As shown in FIG. 1A, a user device may call an IVR system (which may include, or be in communication with an instant access device) and request a web service that is available via a mobile application, a website, or another medium other than the IVR system. In response to the request, the instant access device may authenticate the user device for the web service by communicating with an authentication system in a secure manner. For example, the instant access device may create a hash code for the mobile device based on identification information (e.g., a telephone number) of the user device and a hash key, and may communicate the hash code to the authentication system. The authentication system may verify the identity of the user by comparing the hash code from the IVR system with a hash table (which may include a list of hash codes already registered with the authentication system). By matching the received hash code with a hash code in the hash table, the authentication system may identify user information corresponding to the matching hash code and authenticate the user device based on the user information.

Additionally, or alternatively, the IVR system may cause the user device to access the requested web service, whether by downloading a mobile application with the web service, by accessing a particular webpage with the web service, etc. In some implementations, the IVR system may instead be a web server and a request for the web service may be received in response to the user of the user device selecting a link, an advertisement, or another type of functional interface object, and the instant access device may authenticate the user device in the manner described above. Accordingly, systems and methods, as described herein, provide solutions for authenticating a user device for a web service in a secure manner.

Figure 2:
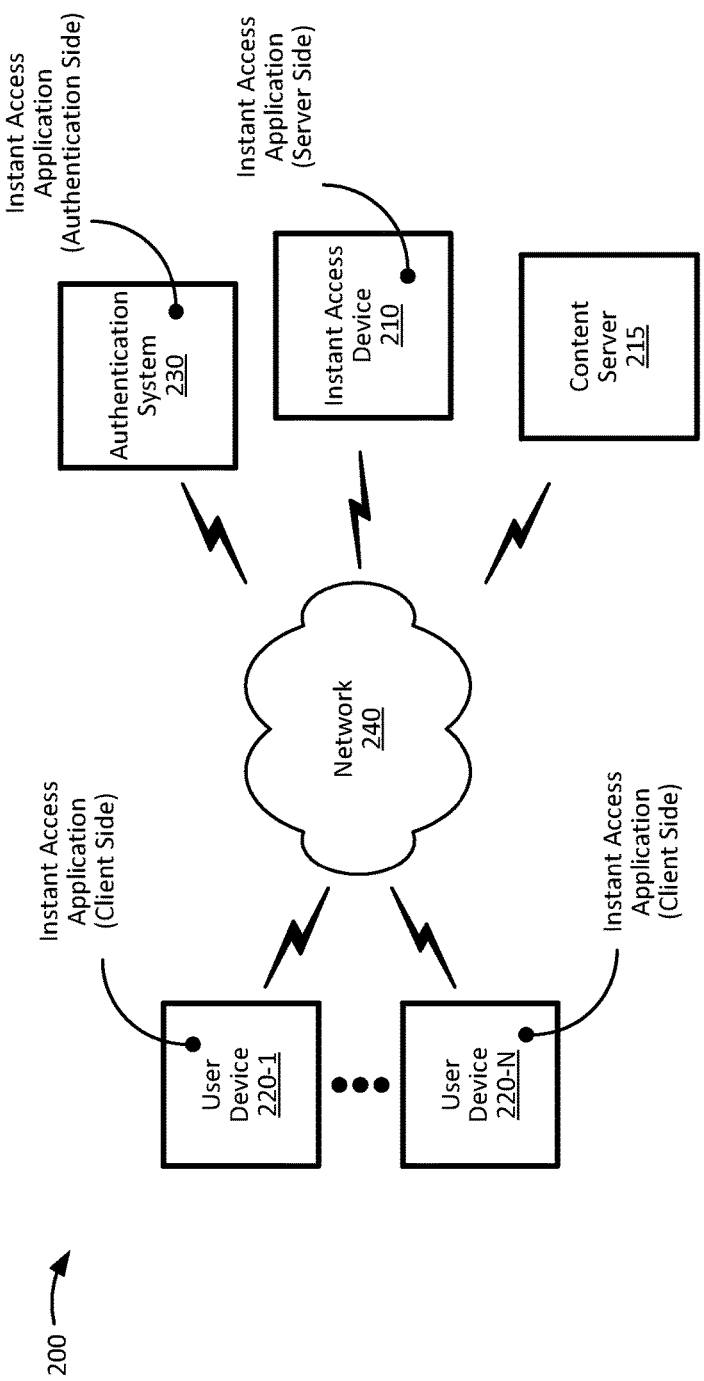
FIG. 2 illustrates an example environment in which systems and/or methods, described herein, may be implemented.

FIG. 2 illustrates an example environment in which systems and/or methods, described herein, may be implemented. As shown in FIG. 2, environment 200 may include instant access device 210, content server 215, user devices 220-1 through 220-N (where N is an integer greater than or equal to 1), authentication system 230, and network 240.

Instant access device 210 may include one or more computing devices, such as a single server device or a collection of server devices. Instant access device 210 may be connected to, or incorporated within, content server 215 (which may include one or more IVR systems capable of communicating with user device 220 via a telephone call, which may include sending and/or receiving audio signals to and from user device 220). In some implementations, content server 215 may also, or alternatively, function as a web server capable of hosting one or more webpages that are accessible by user device 220 via a browser. As such, while instant access device 210 and content server 215 are presented in FIG. 2 as two distinct machines, depictions and/or descriptions of instant access device 210 and content server 215 presented herein may refer to an implementation where instant access device 210 is incorporated within content server 215.

Additionally, or alternatively, content server 215 may include an application server, which may include a repository of mobile applications, from which user device 220 may download a mobile application. In some implementations, the application server may be associated with an "app store," via which users can typically browse, purchase, and/or download applications. Additionally, or alternatively, the application server may operate as an application server for one or more applications installed on user device 220. For instance, user device 220 may download and install a mobile application directed to mapping services from the application server, and the application server may provide one or more types of mapping services to the mobile application installed on user device 220.

Instant access device 210 may include a server-side version of an instant access application that may enable instant access device 210 to cause user device 220 to automatically download and install a mobile application, securely authenticate user device 220 with respect to the mobile application by communicating with authentication system 230, and/or enable user device 220 to instantly access one or more web services via the mobile application (which may involve communicating with content server 215).

User device 220 may include a device capable of communicating via a network, such as network 240. For example, user device 220 may include one or more computing devices, such as a smartphone, a laptop computer, a desktop computer, a tablet computer, etc. User device 220 may include a client-side version of the instant access application, which may enable user device 220 to receive information from sever device 210 to determine whether a particular mobile application is already installed on user device 220, download (e.g., from content server 215) and install a mobile application specified by instant access device 210, access a particular feature of a mobile application (e.g., by communicating with content server 215), and/or perform one or more other functions described herein. In some implementations, the instant access application installed on user device 220 may include a background application capable of running without modifying a display of user device 220 and/or requiring an input from a user of user device 220. User device 220 and instant access device 210 may implement an application programming interface (API), through which user device 220 may communicate with instant access device 210 (e.g., through which instant access device 210 can send instructions according to the API, based on which user device 220 can act (e.g., install a mobile application, display content, access a webpage, etc.)). Additionally, or alternatively, the client-side version of the instant access application may be installed as part of firmware and/or read-only memory (ROM), by a manufacturer and/or vendor of user device 220, and/or may be installed by an end user.

Authentication system 230 may include one or more computing devices, such as a server device or a collection of server devices. Authentication system 230 may be capable of communicating with instant access device 210 to authenticate user device 220 for a particular web service, such as a mobile application, a website, etc. Authentication system 230 may include an authentication-side version of an instant access application, which may enable authentication system 230 to authenticate user device 220 in a secure manner. For example, authentication system 230 may receive a hash code from instant access device 210 and compare the hash code with a hash table to verify that user device 220 is permitted to access a particular web service. As such, the sensitive information passed between instant access device 210 and authentication system 230 to authenticate user device 220 may be secured by implementing a hashing system known only to instant access device 210 and authentication system 230. In some implementations, the information stored by authentication system 230 may not be securely accessed by content device 215 or user device 220, thereby minimizing or eliminating the possibility of bypassing the security measures implemented by authentication system 230.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
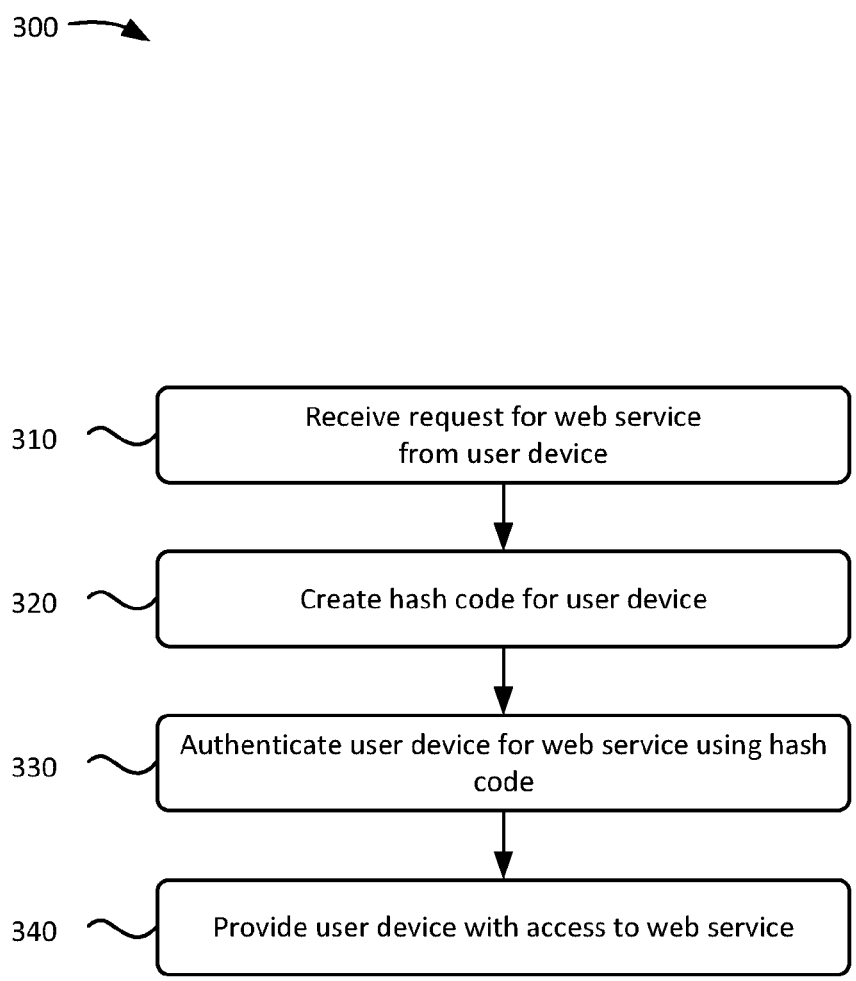
FIG. 3 illustrates a flowchart of an example process for securely authenticating a user device for a web service from the perspective of an instant access device.

FIG. 3 illustrates a flowchart of an example process 300 for securely authenticating a user device for a web service from the perspective of instant access device 210. In some implementations, process 300 may be performed by instant access device 210 (e.g., by an instant access application). In some implementations, some or all of the blocks of process 300 may be performed by one or more other devices.

As shown, process 300 may include receiving a request for a web service from a user device (block 310). For example, instant access device 210 may receive a request for a web service from user device 220. In some implementations, the request for the web service may include an input from a user of user device 220. For instance, instant access device 210 may receive an indication from an IVR system (e.g., an IVR system included in, and/or otherwise associated with, content server 215) that is engaged in a telephone call with user device 220, and instant access device 210 may receive an indication that the user of user device 220 wishes to access a particular web service that is available via a mobile application. The IVR system may offer to provide the web service to user device 220 via the mobile application and instruct the user of user device 220 to provide a particular input (e.g., by pressing "1," by speaking a particular audio command, etc.) in order to accept the offer to access the web service via the mobile application. The user may communicate the request by following the instructions provided by the IVR system. In some implementations, the telephone call may be terminated by the IVR system in response to receiving the request for the web service. In other implementations, the IVR system may terminate the telephone call at another point in time, such as after instant access device 210 has verified that user device 220 has downloaded and installed the mobile application, accessed a particular webpage, etc. In some implementations, the request for the web service may include a user clicking on a link or advertisement on a webpage, in a mobile application, or other type of electronic interface.

Process 300 may include creating a hash code for user device 220 (block 320). For example, instant access device 210 may create a hash code for user device 220. In some implementations, instant access device 210 may create the hash code by applying a hash key to one or more types of user information. For instance, instant access device 210 may apply the hash key to a telephone number of user device 220. In other implementations, instant access device 210 may create the hash code by applying the hash key to a combination of user information, such as a telephone number and a name of the user. The hash key may be stored locally by instant access system 210 and/or may be pre-selected as a hash key to use for a particular authentication system 230. The user information may be received from content server 215 (e.g., along with the indication that user device 220 has requested a particular web service).

Process 300 may include authenticating the user device for the web service using the hash code (block 330). For example, instant access device 210 may authenticate user device 220 for a requested web service based on the hash code. In some implementations, instant access device 210 may communicate the hash code to authentication system 230, and authentication system 230 may compare the hash code to a table of hash codes stored by authentication system 230, in order to identify whether the user is registered for the requested web service. In some implementations, if the hash code from instant access device 210 is located in the hash table of authentication system 230, authentication system 230 may proceed by authenticating the user for the requested web service. However, if the hash code from instant access device 210 is not located in the hash table, instant access device 210 may require the user to register as a new user (e.g., by creating an account for the web service).

Process 300 may include providing the user device with access to the web service (block 340). For example, instant access device 210 may cause user device 220 to access the web service (requested at block 310). In some implementations, instant access device 210 may provide user device 220 with access to the web service by providing user device 220 with access to a particular account. For instance, if the user of user device 220 is already registered for the web service, instant access device 210 may provide user device 220 with access to the web service by providing access to the existing account. However, if the user of user device 220 is not already registered for the web service, instant access device 210 may provide user device 220 with access to the web service by providing user device 220 with access to a newly created account.

In some implementations, instant access device 210 may cause user device 220 to access the web service by communicating one or more types of information and/or instructions to user device 220. The information and/or instructions may include an interface page within a mobile application or a webpage address associated with web services requested by user device 220. Additionally, or alternatively, instant access device 210 may communicate with content server 215 in order to cause user device 220 to access the web service. For example, instant access device 210 may communicate with content server 215 in order to identify a feature or interface page within the mobile application associated with the web service requested by user device 220. In such implementations, information and/or instructions communicated from instant access device 210 to user device 220 may include information received from content server 215.

The operations described above with respect to FIG. 3 may include one or more functions or interactions between the server-side version of the instant access application on instant access device 210 and the client-side version of the instant access application on user device 220. For example, the server-side version of the instant access application may communicate directly (or indirectly (e.g., via a third-party messaging service)) to determine whether a mobile application is already installed on user device 220, to cause user device 220 to automatically download and/or install a mobile application or to access web service in another way (such as accessing a particular webpage), and/or to interact with user device 220 in another way.

While FIG. 3 shows a flowchart diagram of an example process 300 for instantly providing a web service to a user, in other implementations, a process for instantly providing a web service to a user may include fewer operations, different operations, differently arranged operations, and/or additional operations than depicted in FIG. 3.

Figure 4:
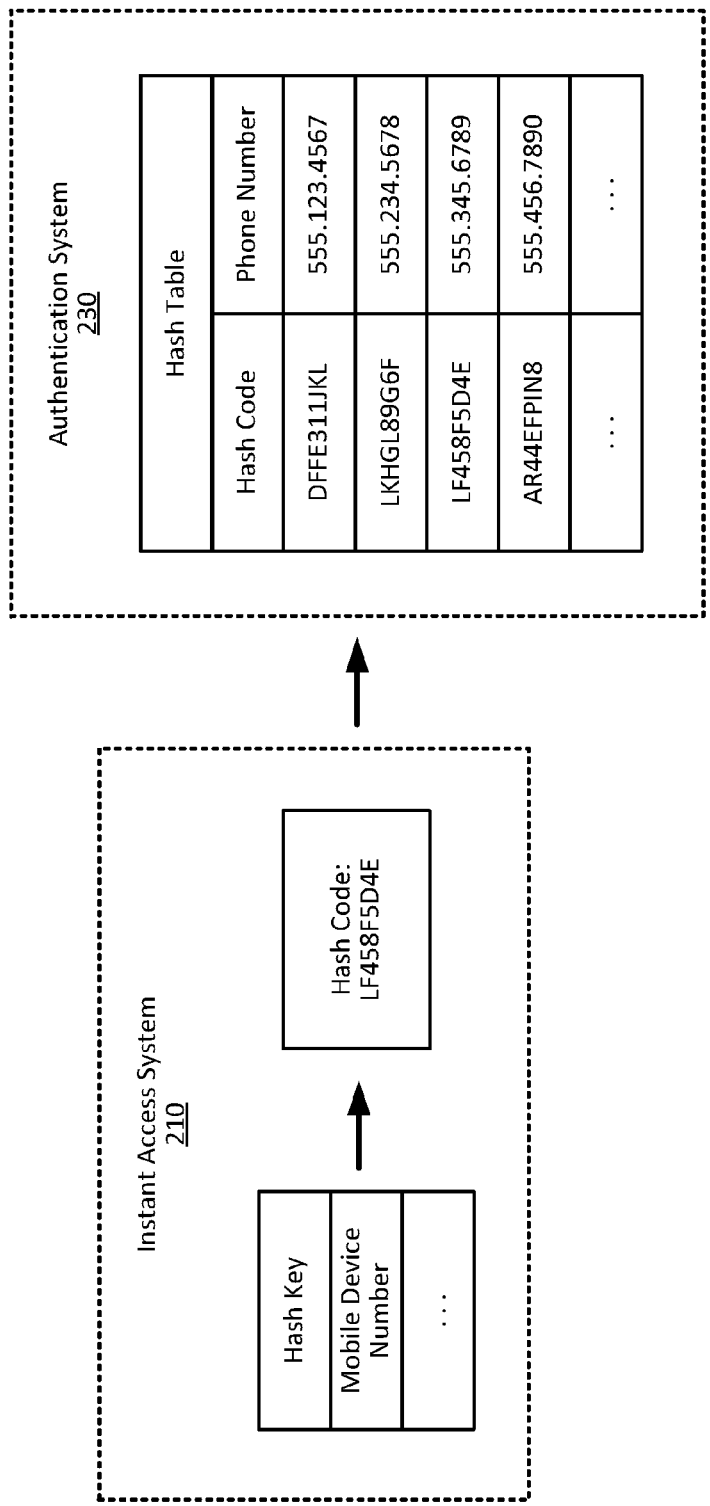
FIG. 4 illustrates example data structures for encoding user authentication information and using the encoded information to authenticate a user device.

FIG. 4 illustrates example data structures for encoding user authentication information and using the encoded information to authenticate a user device. As shown, instant access device 210 may use a hash key, a mobile device number, and/or one or more other types of information (e.g., a name of a user, an address of a user, etc.) to create a hash code. The hash code may be sent to authentication system 230, which may include a hash table with hash codes (e.g., DFFE311JKL, LKHGL89G6F, etc.) that are each associated with a telephone number (e.g., 555.123.4567, 555.234.5678, etc.). Authentication system 230 may compare the hash code received from instant access device 210 with the hash codes in the hash table and thereby verify whether user device 220 is authorized for the web service. As such, instant access system 210 may safely communicate with authentication system 230, since the sensitive information passed from instant access system 210 to authentication system 230 has been encrypted in a way that is only recognizable to authentication system 230.

Figure 5:
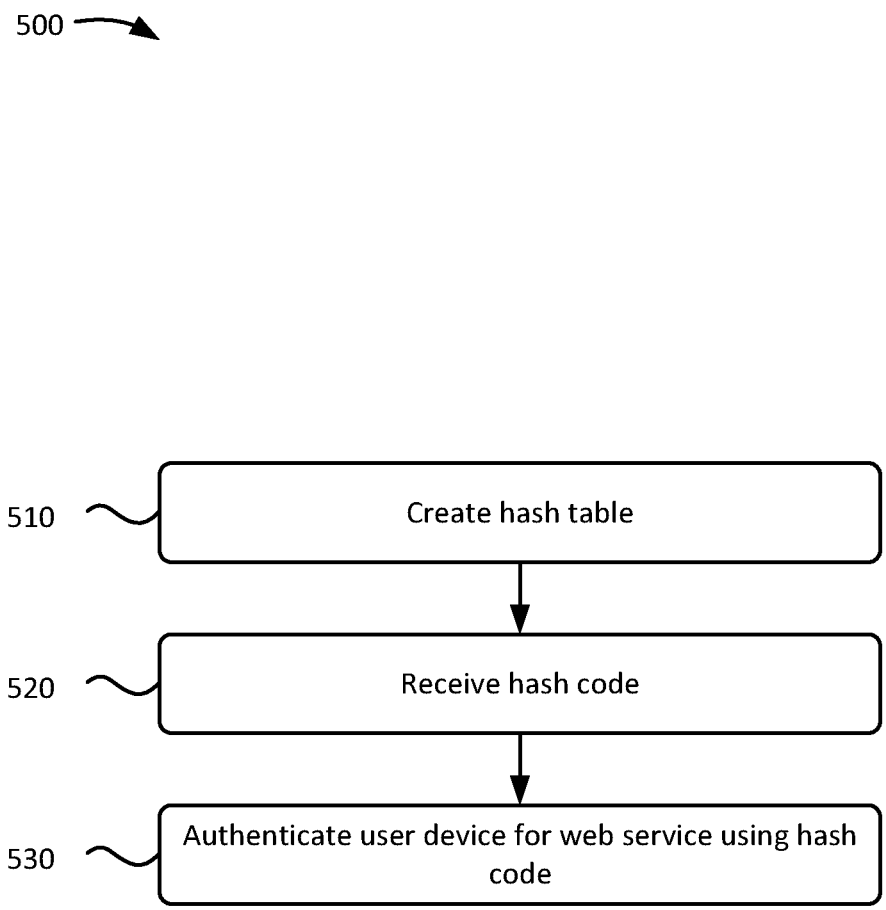
FIG. 5 illustrates a flowchart of an example process for authenticating a user device for a web service from the perspective of an authentication system.

FIG. 5 illustrates a flowchart of an example process 500 for authenticating a user device for a web service from the perspective of authentication system 230. In some implementations, process 300 may be performed by authentication system 230. In some implementations, some or all of the blocks of process 500 may be performed by one or more other devices.

As shown, process 500 may include creating a hash table (block 510). For example, authentication system 230 may create a hash table based on user information and a particular hash key (or encryption keys, which may be a shared key). For example, as discussed above with respect to FIG. 4, the hash table may include a list of hash codes that have been created by applying a hash key to a particular type of user information, such as a telephone number. The hash table may also include hashed versions of other types of information such as a username, a name of a user, a street address, an email address, a web service, etc.

Process 500 may include receiving a hash code (block 520). For example authentication system 230 may receive a hash code. In some implementations, authentication system 230 may receive the hash code from instant access device 210 (which may be operating as a stand-alone device, as shown in FIG. 2, or in combination with another system, such as an IVR system). The hash code may have been created by combining a particular type of user information (e.g., a telephone number) and a particular type of hash key.

Process 500 may include authenticating user device 220 for a web service using the hash code (block 530). For example, authentication system 230 may compare the hash code from instant access device 210, with hash codes stored in the previously created hash table, since the user information and hash key used to create the hash code received from instant access system 210 may be the same combination of user information and hash key used to create the hash codes in the hash table. Upon matching the received hash code with a hash code in the hash table, authentication system 230 may authorize user device 220 for a particular web service or may notify instant access device 210 that the hash key was not found.

While FIG. 5 shows a flowchart diagram of an example process 500 for authenticating a user device for a web service from the perspective of authentication system 230, a process for authenticating a user device for a web service from the perspective of authentication system 230 may include fewer operations, different operations, differently arranged operations, and/or additional operations than depicted in FIG. 5.

Figure 6A:
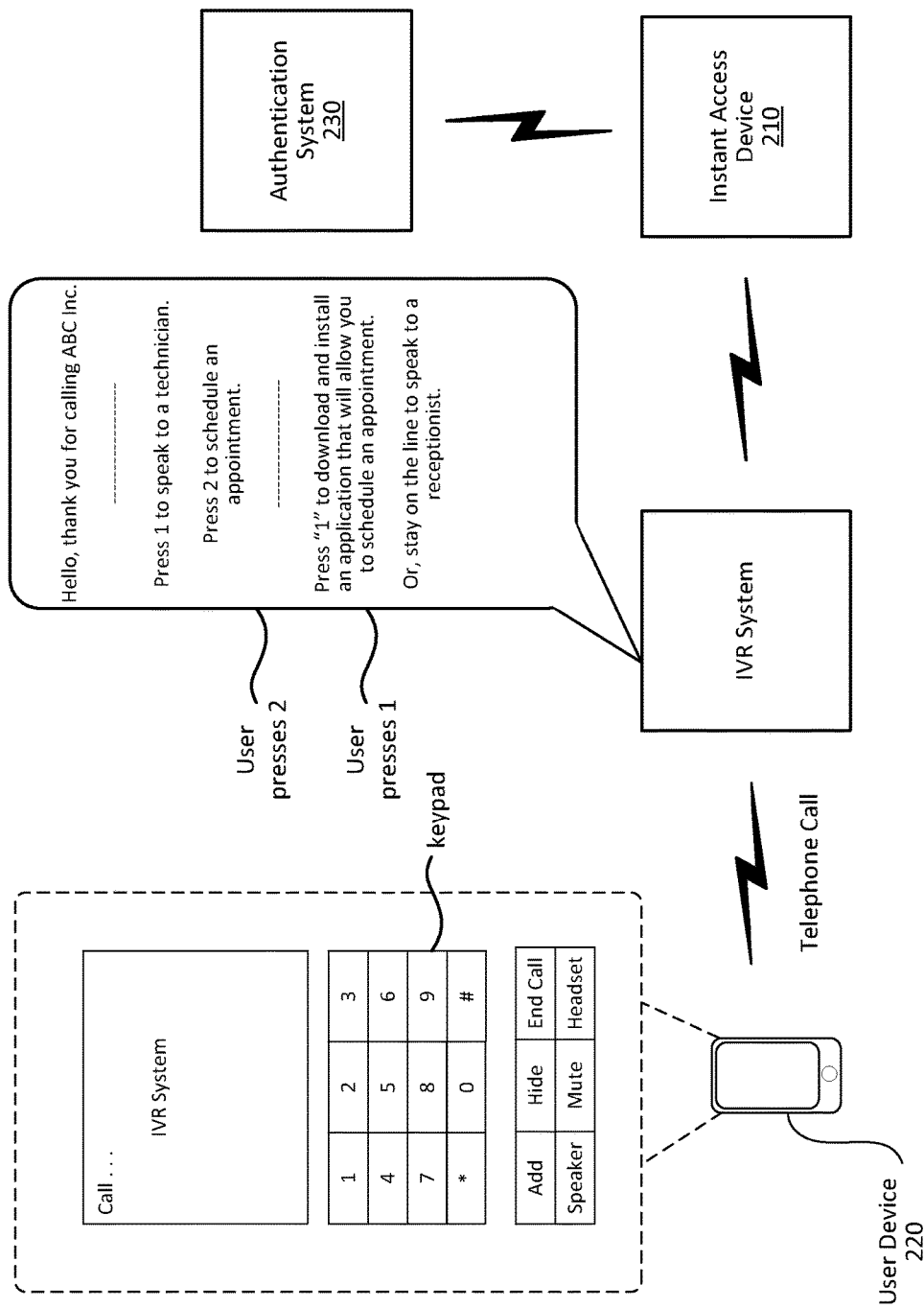
FIGS. 6A-6G illustrate an example context in which a user device may be authenticated for a web service.

FIGS. 6A-6G illustrate an example context in which user device 220 may be authenticated for a web service. As shown in FIG. 6A, user device 220 may engage in a telephone call with an IVR system, which may provide a dialog to welcome the user of user device 220 to the telephone call (e.g., "Hello, thank you for calling ABC Inc."). Additionally, or alternatively, the IVR system may provide menu of options to user device 220, such as "Press 1 to speak to a technician," "Press 2 to schedule an appointment," etc. In the example shown in FIG. 6A, assume that the user of user device selects "2" to schedule an appointment with ABC Inc., and the IVR system responds by providing a menu of options for scheduling an appointment, such as "Press '1' to download and install an application that will allow you to schedule an appointment," "Stay on the line to speak to a receptionist," etc., and the IVR system may communicate with instant access device 210 that user device 220 wishes to download and install the mobile application.

Figure 6C:
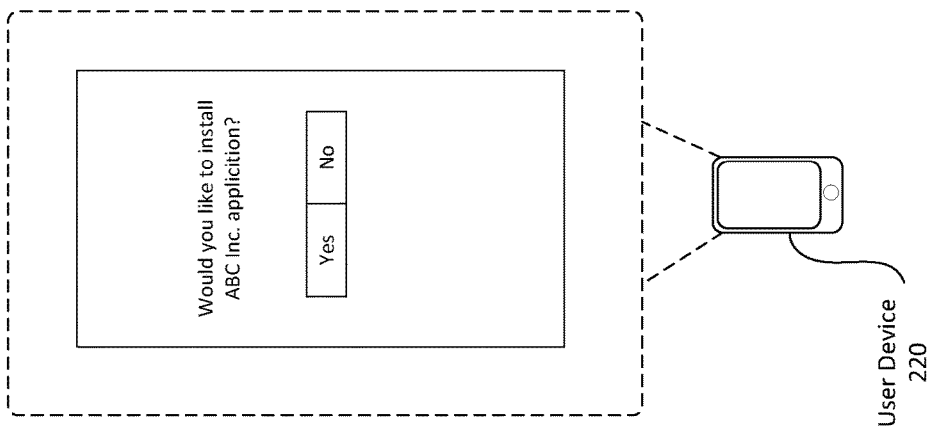
Figure 6B:
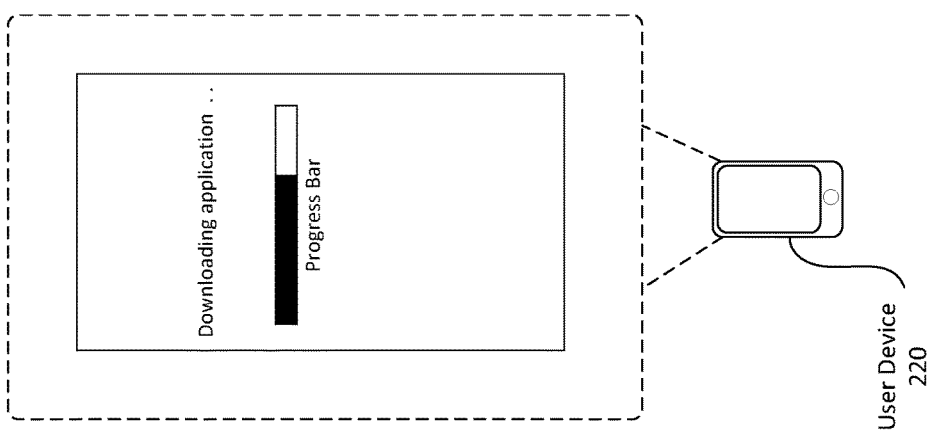

Referring to FIG. 6B, instant access device 210 may cause user device 220 to automatically download the mobile application for ABC Inc., which may result from communications involving a server-side version of an instant access application operating on instant access device 210 and a client-side version of the instant access application operating on user device 220. Upon downloading the mobile application, user device 220 may prompt the user of user device 220 to indicate whether the user would like to install the mobile application, as shown in FIG. 6C, and assuming that the user responds in the affirmative, user device 220 may proceed by installing the mobile application, as shown in FIG. 6D.

Figure 6E:
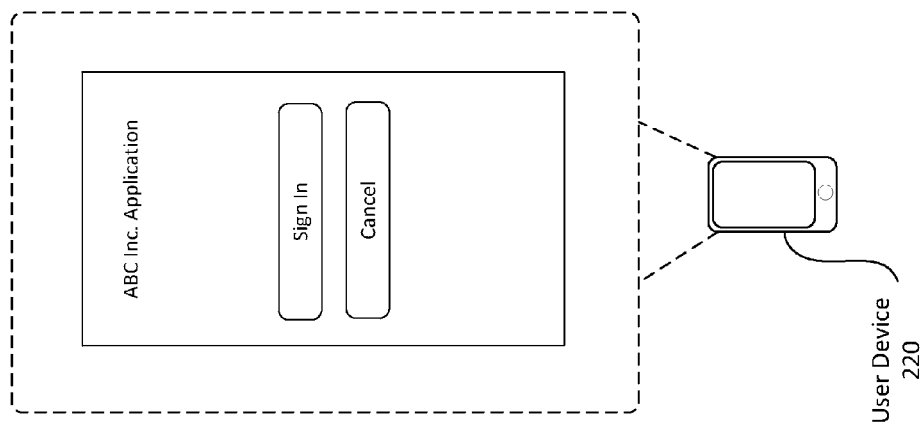
Figure 6D:
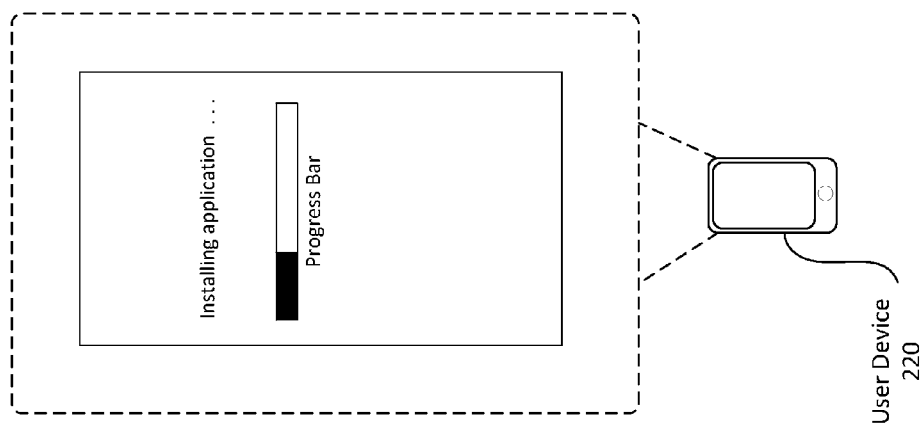

Referring now to FIG. 6E, user device 220 may prompt the user to indicate whether he or she would like to sign in to the mobile application. Assuming that the user responds in the affirmative, instant access system 210 may authenticate user device 220 for the web service by creating a hash code based on a telephone number of user device 220 and a hash key and communicating the hash code to authentication system 230, which may in turn compare the hash code from instant access system 210 with a hash table as described above with reference to FIG. 4.

Figure 6G:
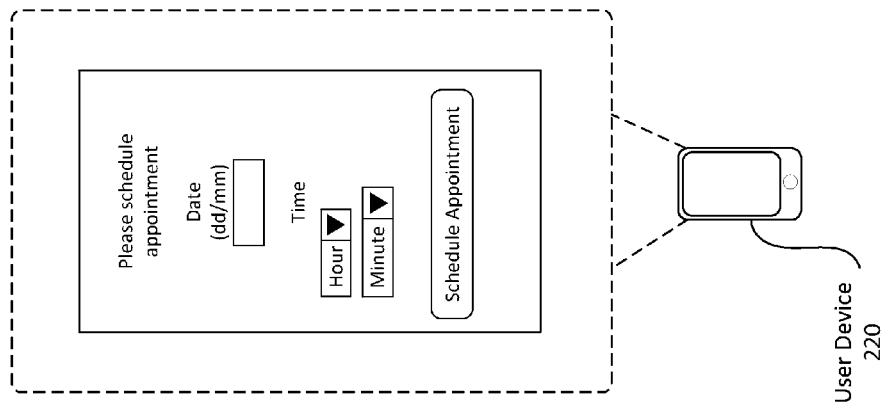
Figure 6F:
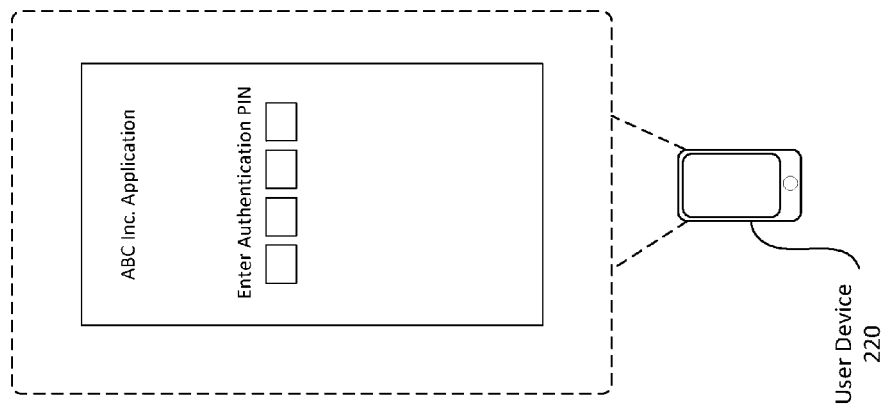

Referring now to FIG. 6F, user device 220 may prompt the user to input a four-digit code (e.g., a personal identification number (PIN)) to ensure the identity of the user requesting to access the mobile application. Requiring authentication information (e.g., a four-digit code) from the user may be subsequent (or otherwise in addition) to authentication processes that occur between instant access system 210 and authentication system 230, and whether user device 220 requires authentication information from the user may depend on security settings of the user. In some implementations, the authentication information (e.g., a four-digit code) may take the place of a user name and password that is typically required to access the mobile application, which may simplify the authentication process since a four-digit code may be easier for the user to remember than a user name and password. In some implementations, the user may input a username, a password, or another type of identification information other than a PIN.

Once user device 220 has been authenticated, instant access device 210 may access the mobile application, as shown in FIG. 6G. For example, user device 220 may instantly access the mobile application and display a page within the mobile application that corresponds to the web service initially requested by user device 220. In the example depicted in FIG. 6G, user device 220 may open a page of the mobile application to access the web service of scheduling an appointment with ABC Inc.

The description provided above with respect to FIGS. 6A-6G provide only one of many possible implementations for securely authenticating user device 220 in accordance with the processes described herein. In other implementations, fewer, additional, and/or alternative operations may be used. For instance, in some implementations, it may be possible to eliminate the operation of prompting the user to verify whether he or she would like to install the mobile application (e.g., FIG. 6C). In such implementations, user device 220 may interpret the user's request in FIG. 6A to download the mobile application as permission to install the application. Similarly, in some implementations, it may be possible to eliminate the operation of prompting the user to verify whether he or she would like to sign in to the mobile application (e.g., 6E) since the user already requested to download and install the application in FIG. 6A. Additionally, or alternatively, it may be possible to eliminate the operation of prompting the user to input a PIN or another type of authentication information. In some implementations, user device 220 may actually be in communication with a web server and request access to a particular web service by clicking a link or advertisement shown in a web page or mobile application hosted by the web server. In other implementations, the IVR system and instant access device 210 may authenticate user device 220 at the beginning of the telephone call, before asking the user if he or she would like to access the web service via a mobile application. As such, the operations for securely authenticating user device 220 for a web server may include one or more of a variety of operations and/or situations.

Figure 7A:
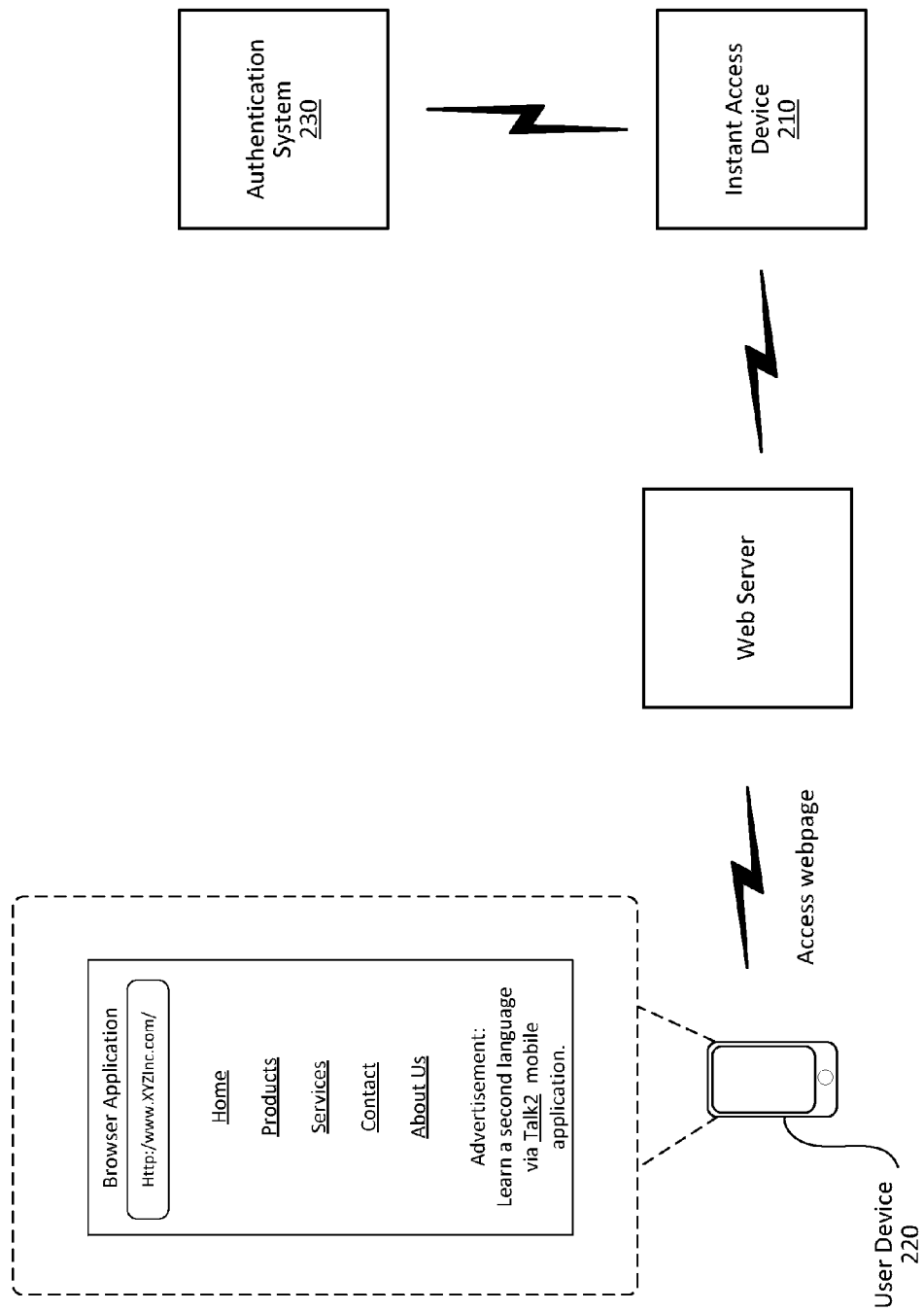
FIGS. 7A-7D illustrate an example of another context in which a user device may be authenticated for a web service.

FIGS. 7A-7D illustrate an example of another context in which user device 220 may be authenticated for a web service. As shown in FIG. 7A, user device 220 may communicate with a web server to access a webpage using a browser application installed on user device 220. The webpage may include one or more functional interface objects, such as one or more links to other webpages within a website (e.g., a Home link, a Products link, a Services link, a Contact link, an About Us link, etc.). The webpage may also, or alternatively, include an advertisement for a mobile application (e.g., Talk2).

Figure 7C:
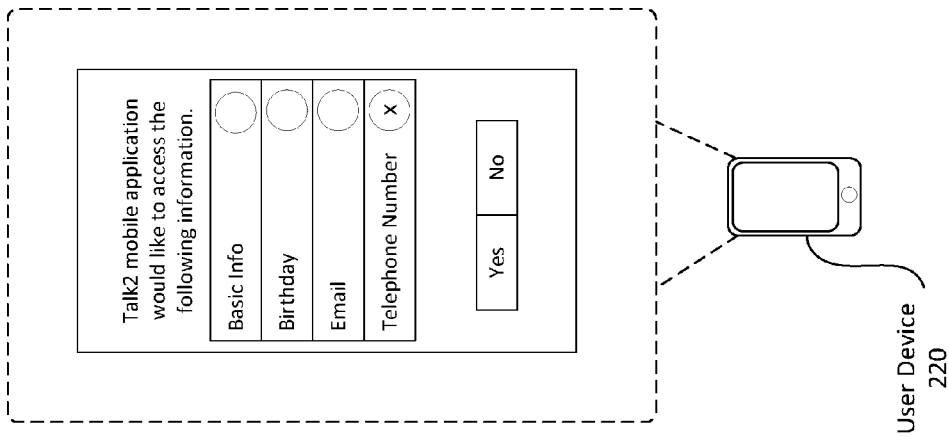
Figure 7B:
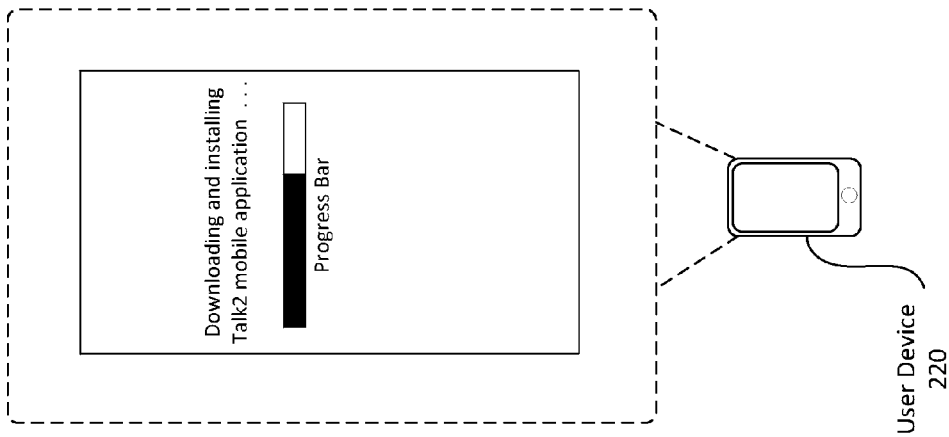
Figure 7D:
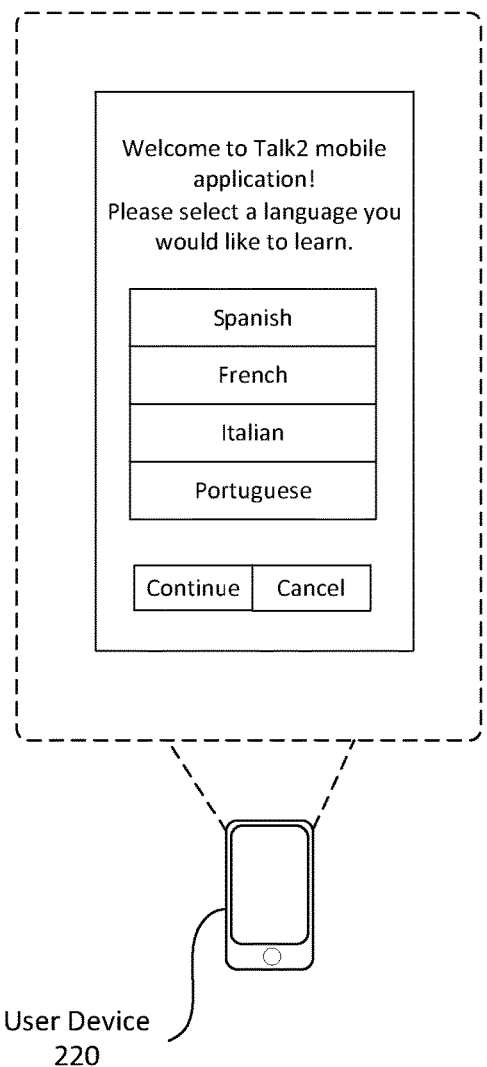

Referring now to FIG. 7B, in response to selecting the advertisement, instant access device 210 (shown in FIG. 2) may cause user device 220 to automatically download and install the mobile application associated with the advertisement. As shown in FIG. 7C, instant access device 210 and/or user device 220 may determine which types of information the newly installed mobile application would like to access for identification/authentication purposes. For instance, the newly installed application may need to access one or more types of basic information, such as a name of the user, a street address of the user, etc., a birthday of the user, an email address associated with the user, a telephone number associated with user device 220, and/or one or more other types of information. Additionally, or alternatively, user device 220 may display the information required and/or provide the user with the opportunity to give or withhold permission to the information (e.g., by selecting "Yes" or "No). Upon providing the requested information, user device 220 may be automatically authenticated the newly installed application, as shown in FIG. 7D. Instant access device 210 may authenticate user device 220 in accordance with the description provided herein. For instance, instant access device 210 may apply a hash key to the telephone number (and/or additional information) of user device 220, create the resulting hash code to authentication system 230, and authentication system 230 may authenticate user device 220 by comparing the hash code to a hash table stored by authentication system 230. Accordingly, user device 220 may gain instant access to a mobile application that via a webpage displayed to a user.

Figure 8:
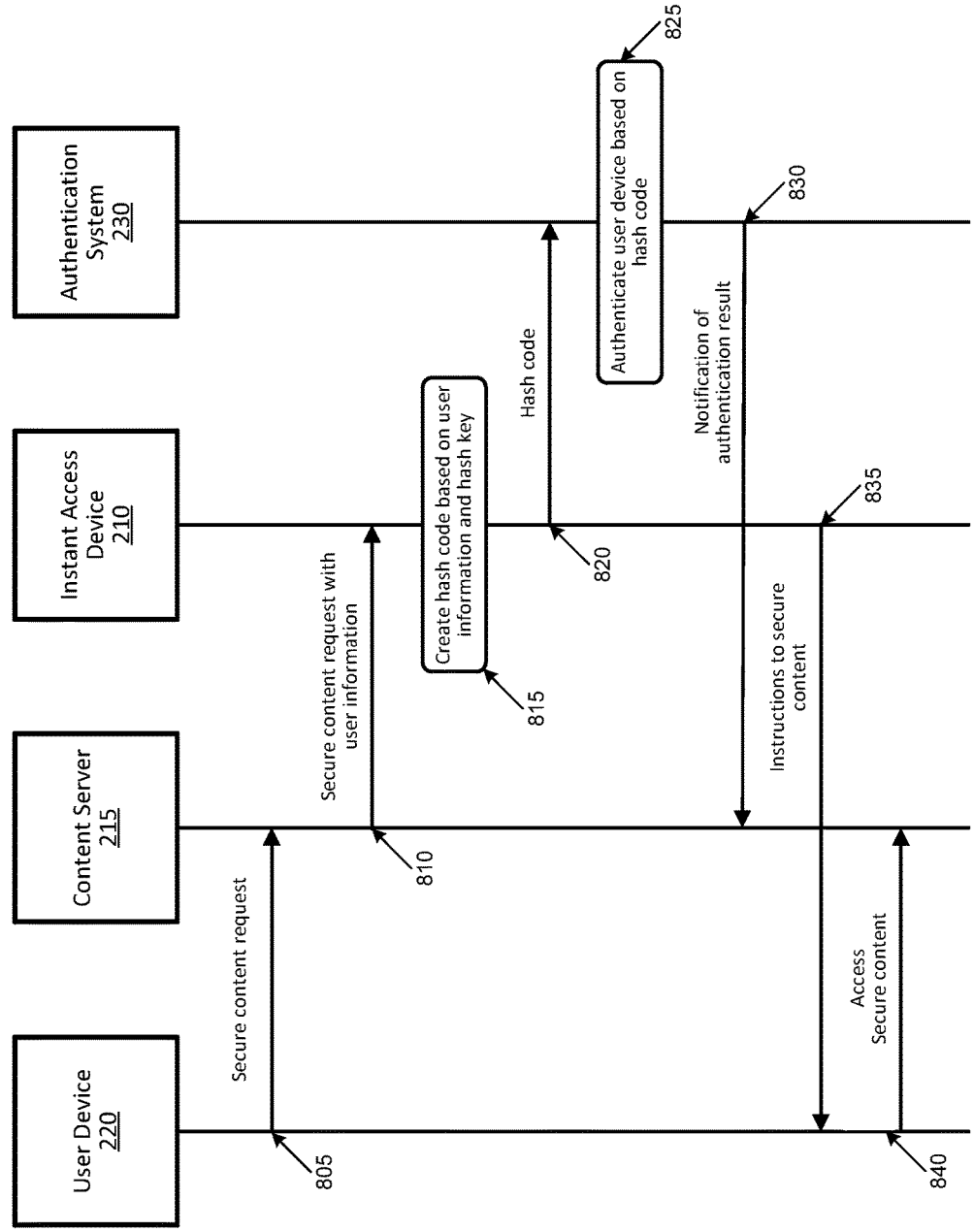
FIG. 8 illustrates a sequence flow diagram of an example implementation for securely authenticating a user device for a web service.

FIG. 8 illustrates a sequence flow diagram of an example implementation for securely authenticating a user device for a web service. While FIG. 8 shows an example implementation for securely authenticating a user device for a web service, other implementations may include fewer operations, different operations, differently arranged operations, and/or additional operations than depicted in FIG. 8.

As shown in FIG. 8, user device 220 may communicate (at 805) a request for secure content to content server 230. The secure content may correspond to a web service that is available via a mobile application, a website, or another medium that requires authentication. User device 220 may communicate the request to content server 215 during a telephone call with content server 215 or while accessing a web page hosted by content server 215. Content server 215 may notify (at 810) instant access device 210 of the request and/or provide one or more types of user information, such as a user's name, a password, a street address, a telephone number, etc. Instant access device 210 may create (at 815) a hash code based on the user information and a hash key stored by instant access device 210, and may communicate (at 820) the hash code to authentication system 230.

Authentication system may authenticate (at 825) user device 220 for the web service based on the hash code received from instant access device 210 by comparing the hash code with a hash table stored by authentication system 230. The hash table may include a list of pre-registered hash codes that are associated with user information (e.g., a user's name, a password, a street address, a telephone number, etc.) for identifying/authenticating user devices. Authentication system 230 may notify (at 830) content server 215 (and/or instant access device 210) that user device 220 has been authenticated, and instant access device 210 may provide instructions to user device 220 for automatically accessing the web service via the mobile application. For instance, user device 220 may include an API whereby user device 220 may be instructed to download a mobile application from a certain universal resource locator (URL), Internet protocol (IP) address, etc. In some implementations, the authentication of user device 220 by authentication system 230 may fail (e.g., the hash value may not match a value stored, for user device 220, by authentication system 230). In such scenarios, authentication system 230 may notify content server 215 (and/or instant access device 210), and instant access device 210 may provide instructions to user device 220 for creating a new account before accessing the web service, may request additional authentication information, may notify user device 220 that the authentication failed, etc.

Figure 9:
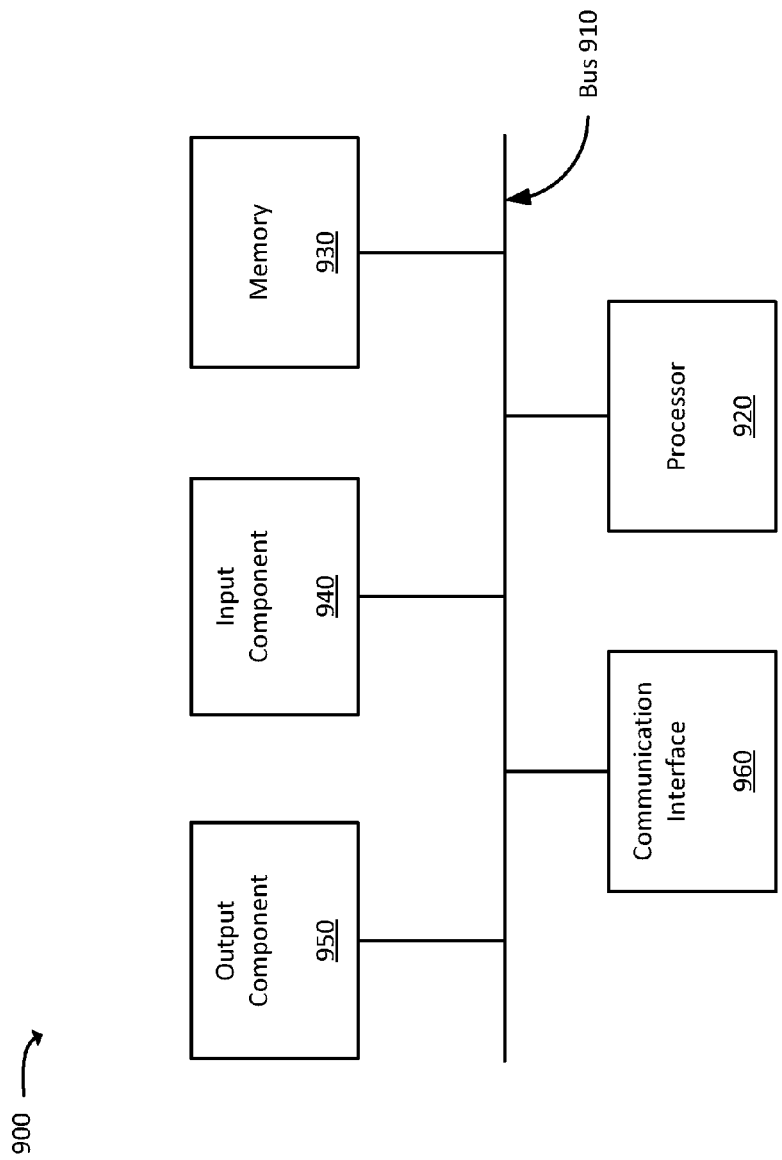
FIG. 9 illustrates example components of one or more devices, according to one or more implementations described herein.

FIG. 9 is a diagram of example components of device 900. One or more of the devices described above (e.g., with respect to FIGS. 1, 2, 4, 6A-6G, 7A-7D, and 8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
    presenting, by one or more devices, an interactive menu to a user device during a telephone call in which the user device is engaged, wherein the interactive menu includes an option to download and install an application;
    receiving, by the one or more devices, from the user device, and via a selection of the option of the interactive menu, a request to download and install the application;
    in response to receiving the selection of the option, presented via the interactive menu, to download and install the application, and prior to installation of the application by the user device, ending, by the one or more devices, the telephone call;
    providing, by the one or more devices, the requested application, wherein providing the requested application facilitates installation of the application by the user device;
    determining, by the one or more devices and based on providing the application to the user device, identification information associated with the user device;
    creating, by the one or more devices, a hash code based on the identification information and a hash key;
    communicating, by the one or more devices, the hash code to an authentication system, wherein the authentication system determines, based on the hash code, whether to provide secure content to the user device via the application,
    wherein communicating the hash code to the authentication system causes the authentication system to authenticate the request for secure content by comparing the hash code to a hash table stored by the authentication system, the hash table comprising pre-generated hash codes associated with authorized user devices;
    receiving, by the one or more devices, an indication from the authentication system of whether the secure content should be provided to the user device;
    providing, by the one or more devices, the secure content to the user device via the application when the authentication system has determined that the secure content should be provided to the user device; and
    requesting, by the one or more devices and via the application, additional information from the user device when the authentication system has not determined that the secure content should be provided to the user device.

2. The method of claim 1, wherein the identification information associated with the user device includes a telephone number of the user device.

3. The method of claim 2, wherein the identification information associated with the user device further comprises one or more types of user information in addition to the telephone number of the user device.

4. The method of claim 1, further comprising receiving a request to access the secure content in response to a selection, at the user device, of a link in a web page.

5. The method of claim 1, wherein providing the secure content to the user device includes causing the user device to access a web page.

6. A system, comprising:
    a non-transitory memory device storing a plurality of processor-executable instructions; and
    a processor configured to execute the processor-executable instructions, wherein executing the processor-executable instructions cause the system to:
        present an interactive menu to a user device during a telephone call in which the user device is engaged, wherein the interactive menu includes an option to download and install an application,
        receive, from the user device and via a selection of the option of the interactive menu, a request to download and install the application, in response to receiving the selection of the option, presented via the interactive menu, to download and install the application, and prior to installation of the application by the user device, ending, by the one or more devices, the telephone call, provide the requested application, wherein providing the requested application facilitates installation of the application by the user device, determine, based on providing the application to the user device, identification information associated with the user device, create a hash code based on the identification information and a hash key, communicate the hash code to an authentication system, wherein the authentication system determines, by comparing the hash code to a hash table stored by the authentication system, whether to provide secure content to the user device via the application, wherein the hash table includes pre-generated hash codes associated with authorized user devices, receive an indication from the authentication system of whether the secure content should be provided to the user device, provide, via the application, the secure content to the user device when the authentication system has determined that the secure content should be provided to the user device, and request, via the application, additional information from the user device when the authentication system has not determined that the secure content should be provided to the user device.

7. The system of claim 6, wherein the identification information associated with the user device includes a telephone number of the user device.

8. The system of claim 7, wherein the identification information associated with the user device further comprises one or more types of user information in addition to the telephone number of the user device.

9. The system of claim 6, wherein the additional user information includes information for creating a new user account in order to access the secure content.

10. The system of claim 6, wherein the application requests the secure content.

11. The system of claim 6, wherein executing the processor-executable instructions further causes the system to request to access the secure content in response to a selection, at the user device, of a link in a web page.

12. The system of claim 6, wherein, to provide the secure content to the user device, the processor-executable instructions cause the system to, provide instructions to the user device for accessing a web page.

13. A non-transitory computer-readable medium storing instructions, which, when executed by one or more processors associated with a device, cause the one or more processors to:

present an interactive menu to a user device during a telephone call in which the user device is engaged, wherein the interactive menu includes an option to download and install an application;

receive, from the user device and via a selection of the option of the interactive menu, a request to download and install the application;

in response to receiving the selection of the option, presented via the interactive menu, to download and install the application, and prior to installation of the application by the user device, end the telephone call;

provide the requested application, wherein providing the requested application facilitates installation of the application by the user device;

determine, based on providing the application to the user device, identification information associated with the user device;

create a hash code based on the identification information and a hash key;

communicate the hash code to an authentication system, wherein the authentication system determines, based on the hash code, whether to provide the secure content to the user device via the application, wherein communicating the hash code to the authentication system causes the authentication system to determine whether to provide the secure content by comparing the hash code to a hash table stored by the authentication system, the hash table comprising pre-generated hash codes associated with authorized user devices;

receive an indication from the authentication system of whether the secure content should be provided to the user device, provide the secure content to the user device via the application when the authentication system has determined that the secure content should be provided to the user device, and request, via the application, additional information from the user device when the authentication system has not determined that the secure content should be provided to the user device, wherein the additional user information includes information for creating a new user account in order to access the secure content.

14. The non-transitory computer-readable medium of claim 13, wherein the identification information associated with the user device includes a telephone number of the user device.

15. The non-transitory computer-readable medium of claim 13, wherein the interactive menu, presented during the telephone call, is an interactive voice response ("IVR") menu.

16. The non-transitory computer-readable medium of claim 15, wherein the selection of the option, presented via the IVR menu, includes a keypress at the user device.

17. The method of claim 1, wherein the interactive menu, presented during the telephone call, is an interactive voice response ("IVR") menu, and wherein the selection of the option, presented via the IVR menu, includes a keypress at the user device.

18. The system of claim 6, wherein the interactive menu, presented during the telephone call, is an interactive voice response ("IVR") menu, and wherein the selection of the option, presented via the IVR menu, includes a keypress at the user device.

19. The method of claim 14, wherein the identification information associated with the user device further includes an email address associated with the user device.

20. The system of claim 7, wherein the identification information associated with the user device further includes an email address associated with the user device.

* * * * *